US005476283A

United States Patent [19]
Elton

[11] Patent Number: 5,476,283
[45] Date of Patent: Dec. 19, 1995

[54] SELECTIVELY DEPLOYABLE VEHICLE KNEE RESTRAINT

[75] Inventor: Robert Elton, Ann Arbor, Mich.

[73] Assignee: MascoTech Automotive Systems, Inc., Auburn Hills, Mich.

[21] Appl. No.: 190,407

[22] Filed: Feb. 2, 1994

[51] Int. Cl.⁶ .................................................. B60R 21/045
[52] U.S. Cl. ................................................ 280/753; 280/752
[58] Field of Search .................................. 280/753, 752, 280/751, 748; 180/90; 296/70; 293/118, 119

[56] References Cited

U.S. PATENT DOCUMENTS

| | | | |
|---|---|---|---|
| 2,180,912 | 11/1939 | Rogers | 280/753 |
| 2,650,835 | 9/1953 | Gonsett | 280/752 |
| 2,768,003 | 10/1956 | Apel et al. | 280/753 |
| 2,855,216 | 10/1958 | Sacks | 280/753 |
| 2,902,292 | 9/1959 | Land | 280/753 |
| 3,133,746 | 5/1964 | Zazzara | 280/753 |
| 3,441,103 | 4/1969 | Lymar | 280/753 |
| 3,630,542 | 12/1971 | Wycech | 280/753 |
| 3,702,706 | 11/1972 | Sobkow | 180/90 |
| 3,802,527 | 4/1974 | Tezuka | 280/753 |
| 3,951,427 | 4/1976 | Wilfert | 280/752 |
| 4,062,566 | 12/1977 | Hensler et al. | 280/751 |
| 5,071,162 | 12/1991 | Takagawa | 280/752 |
| 5,344,184 | 9/1994 | Keeler et al. | 280/753 |
| 5,374,105 | 12/1994 | Kracht et al. | 280/753 |

FOREIGN PATENT DOCUMENTS 0739676  11/1955  United Kingdom ................... 280/753

Primary Examiner—Margaret A. Focarino
Assistant Examiner—Peter C. English
Attorney, Agent, or Firm—Edgar A. Zarins; Malcolm L. Sutherland

[57] ABSTRACT

A knee restraint for the interior passenger compartment of a vehicle which deploys upon sudden deceleration such as vehicle impact. The knee restraint system acts as a passive restraint for the lower part of the passengers' body to restrain forward movement. The restraint system includes independent restraint pads which normally form a portion of the dashboard. Spring-biased linkages extend the restraint pads into the passenger compartment closer to the occupant. An inertia latch prevents deployment until a predetermined rate of deceleration is reached. One embodiment of the restraint system incorporates the glove box.

18 Claims, 5 Drawing Sheets

SELECTIVELY DEPLOYABLE VEHICLE KNEE RESTRAINT

BACKGROUND OF THE INVENTION

I. Field of the Invention

This invention relates to a restraint engageable with the knees of a vehicle occupant to prevent the occupant from sliding forwardly upon deceleration and, in particular, to a selectively deployable knee restraint for both the driver and passenger of the vehicle which is deployed upon sudden deceleration of the vehicle such as upon impact.

II. Description of the Prior Art

Restraint systems which deploy upon sudden deceleration of a vehicle, such as during impact, have become increasingly popular for the vehicle interior. Additionally, passive restraint systems are being mandated through legislation aimed at protecting the general public. The earliest restraint systems include lap and shoulder harnesses which essentially "tie" the vehicle occupant down. A increasing number of vehicles incorporate air bags for the front seat occupants. The air bags are designed to deploy upon impact cushioning the vehicle occupants against impact with the steering column, dashboard or other structure which could injure the occupants.

Despite the added restraint systems to protect occupants of the vehicle, it has been found that in certain situations and with certain vehicles, the occupants can slide along the vehicle seat beneath the protection of the air bag or safety belts. Besides avoiding the beneficial restraint of the safety system, with sufficient distance and deceleration, considerable leg and knee damage can occur as the vehicle occupant impacts the dashboard. In an attempt to reduce injury, the knee bolsters of the dashboard are padded to soften any impact. Additionally, recent federal rules have mandated a maximum distance between the knee bolster and the typical vehicle occupant to limit damage by reducing the impact force. However, by mandating a standard based upon an average, such safety features fail for a large group of the population. In the case of tall occupants requiring increased leg room, the mandated distance may not provide sufficient space for comfortable seating requiring compensation by some other means. Such compensation may result in circumvention of the safety features.

It is also recognized that any safety feature should be inexpensive to incorporate into the vehicle and should be inexpensive to reset following deployment. Currently it costs several hundred dollars to repack the air bags once they have been deployed. Moreover, since the cost of any new vehicle feature will be ultimately passed on to the purchaser, such features must be reasonable to value conscious consumers.

SUMMARY OF THE PRESENT INVENTION

The present invention overcomes the disadvantages of the prior known passive restraint systems by providing a knee restraint for both the driver and front seat passenger which deploys upon sudden deceleration, such as impact, to provide added means for preventing forward movement of the vehicle occupants.

The restraint system of the present invention comprises individually deployable knee restraints for both the driver and front seat passenger which deploy upon rapid deceleration such as vehicle impact. Normally, the knee restraints form a part of the knee bolster portion of the vehicle dashboard. The knee restraint surface deploys outwardly from the dashboard to engage the knees of the vehicle occupant to prevent the lower part of the occupant's body from moving forward. On the driver's side, the restraint circumscribes the steering column to provide restraint on both sides of the column. On the passenger's side, the knee restraint may be formed by or incorporate the glove box. In either embodiment, the knee restraint deploys instantaneously upon impact yet must be sufficiently rigid to withstand and restrain the impact of the passenger.

The knee restraint surface is selectively deployable by a spring-biased linkage which extends the knee pad and locks it into position. The linkage comprises an upper pivotably extendable linkage arm and a lower pivot arm to support the bottom portion of the restraint pad. In addition, a sliding linkage facilitates lateral extension of the pad. The upper and lower linkage arms are connected to an inertia latch which prevents deployment until a predetermined rate of deceleration is achieved. In a preferred embodiment, a single inertia latch engages both the upper and lower linkages thereby ensuring deployment of both simultaneously upon release of the latch. The upper linkage is biased to deploy the knee restraint by a spring extending between the linkage and a fixed structure of the vehicle. The slider bar acts as a guide to facilitate horizontal deployment of the restraint. In the passenger-side restraint, the slider bar includes latching means for engaging the glove box door. Upon impact the door will be reengaged to ensure travel as part of the restraint system.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
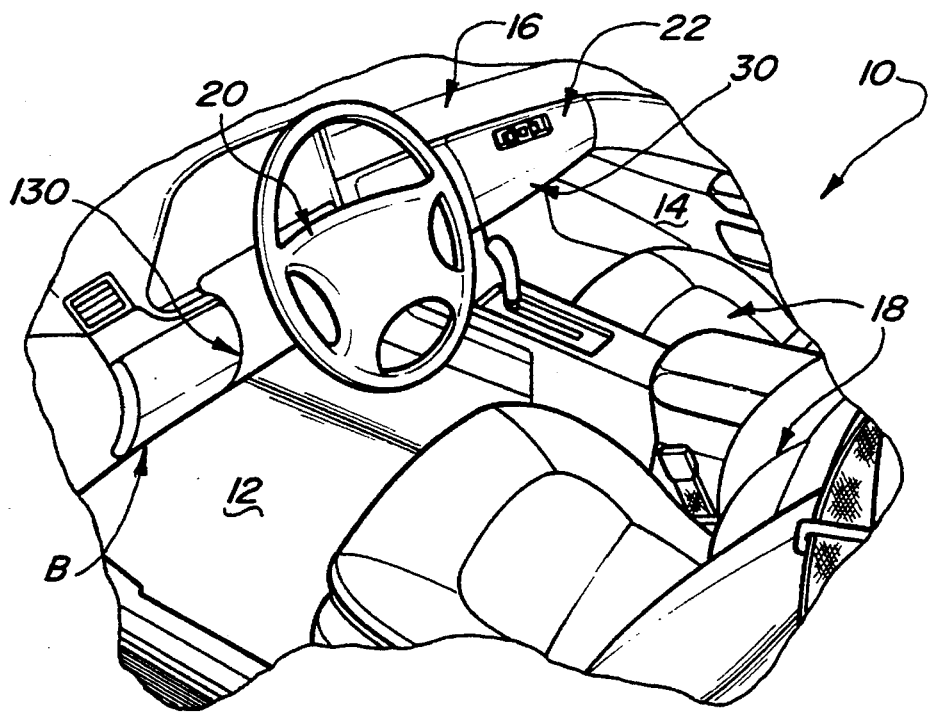
FIG. 1 is a partial perspective view of an interior passenger compartment of a vehicle embodying a knee restraint system of the present invention.

Referring first to FIG. 1, there is shown a partial view of the interior passenger compartment 10 of a vehicle including a driver's side 12 and a passenger's side 14. As is typical of vehicle interiors 10, instrumentation for the vehicle is disposed in a dashboard 16 extending across the front of the interior compartment 10 and seats 18 for the passenger and driver are provided. In order to allow the driver to control the vehicle, a steering column 20 extends from the dashboard 16 on the driver's side 12. A glove box 22 may be provided on the passenger's side 14 for storage of miscellaneous items. In prior known vehicles, the dashboard 16 is configured with a knee bolster B along the bottom edge of the dashboard 16. This bolster B protrudes into the interior compartment 10 to limit the distance between the knees of the occupants seated in seats 18 and the bolster B formed in the dashboard 16. However, such protrusion also reduces the leg room available to the passengers.

The present invention overcomes this disadvantage by providing knee restraints for both the driver's side 12 and the passenger's side 14 which deploy upon sudden deceleration of the vehicle to extend into the passenger compartment 10 restraining the lower part of the occupant's bodies from moving forward. During normal operation of the vehicle, the restraints remain retracted within the dashboard 16 increasing the leg room for the occupants. In a preferred embodiment of the present invention, a passenger knee restraint 30 is provided on the passenger's side 14 and a driver knee restraint 130 is provided on the driver's side 12. These restraints 30, 130 operate independently but in a very similar manner.

Figure 2:
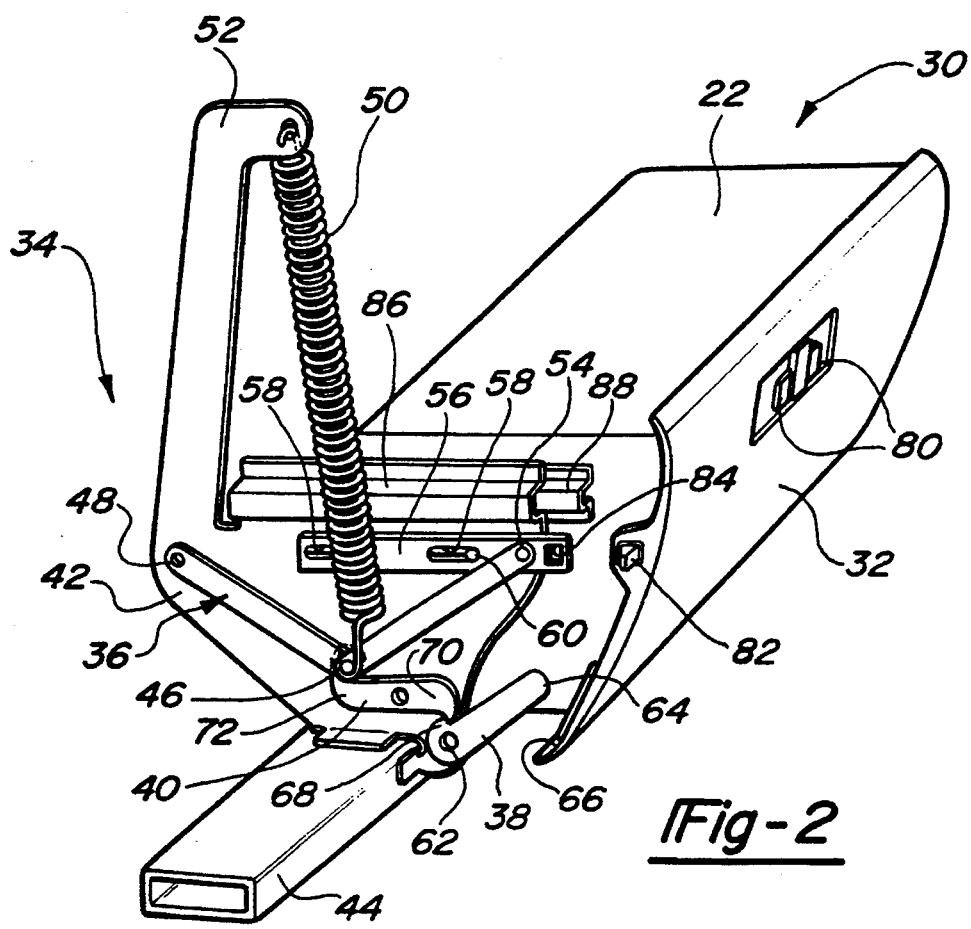
FIG. 2 is a perspective view of a first embodiment of the knee restraint system during normal vehicle operation.
Figure 3:
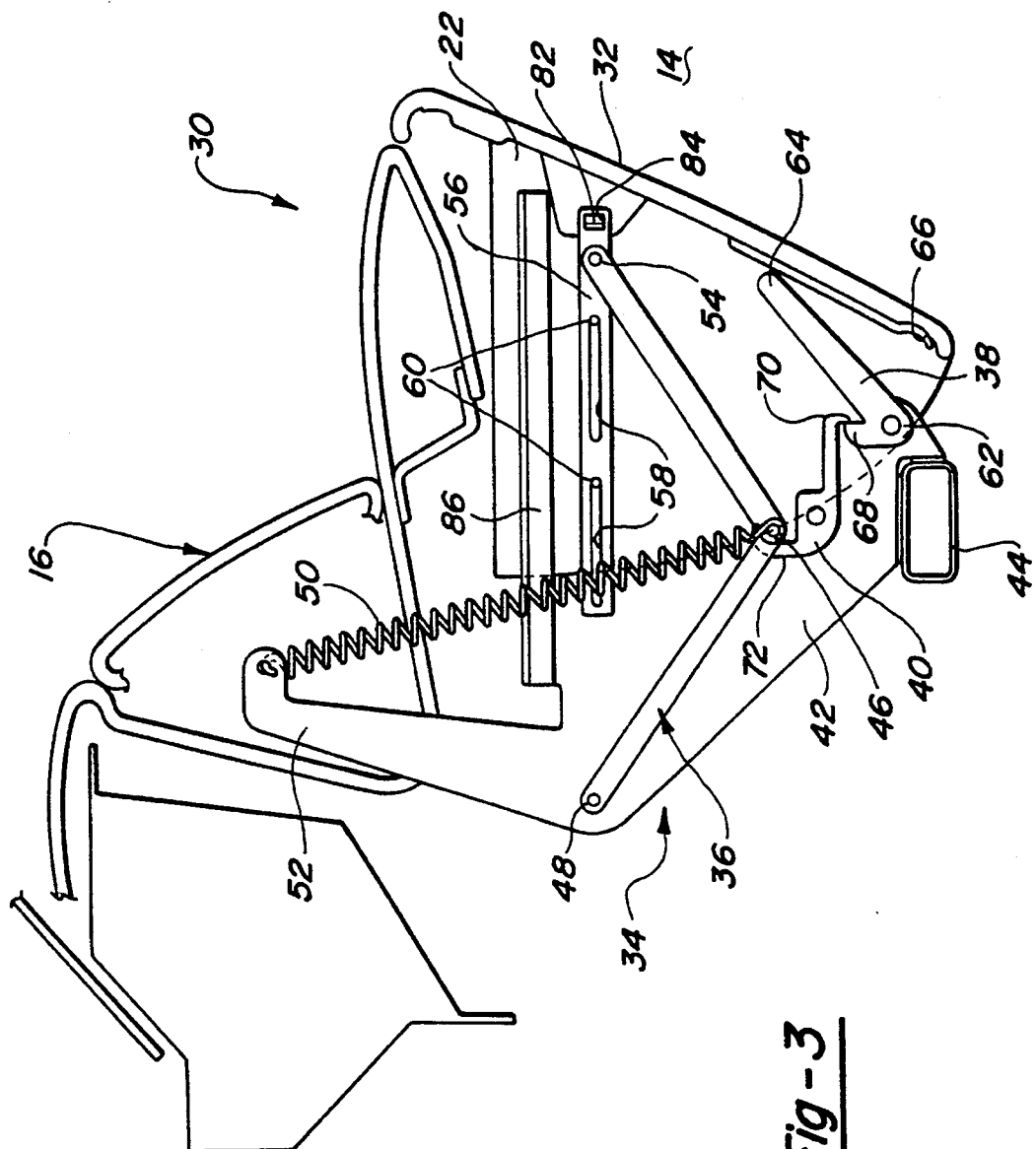
FIG. 3 is a side view of the knee restraint system in its normal position.
Figure 4:
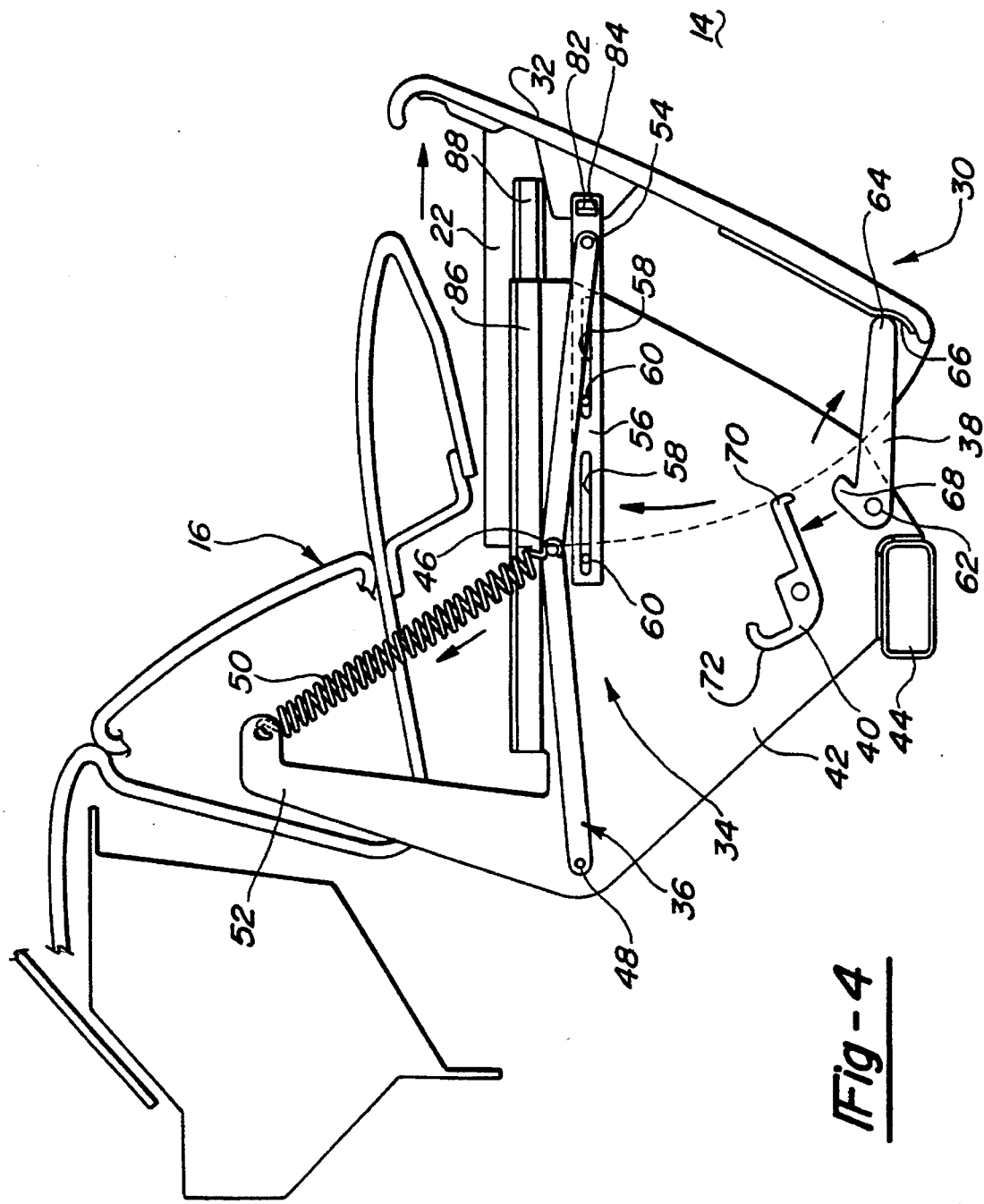
FIG. 4 is a side view of the knee restraint system deployed rearwardly in the vehicle.

Referring now to FIGS. 2 through 6, the passenger's side knee restraint 30 is shown as including the glove box 22. Since most modern vehicles incorporate a glove box 22, the passenger knee restraint 30 will be described as including the box 22 although it should be understood that the knee restraint 30 will operate just as effectively without the built-in glove box 22. FIG. 2 shows the glove box 22 partially open. The front or door of the glove box 22 forms a restraint panel 32 which extends into the passenger compartment upon deployment. The knee restraint deployment assembly 34 includes an upper linkage arm 36 and a lower pivot arm 38. During normal operation both arms 36 and 38 are connected to an inertia latch 40 which controls deployment of the knee restraint. The entire deployment assembly 34 is mounted to a bracket 42. The bracket 42 in turn is mounted to a cross beam 44 which forms a part of the reinforcement structure of the vehicle interior.

The upper linkage arm 36 includes two segments pivotably joined at an elbow 46. A first end 48 of the linkage arm 36 is pivotably attached to the bracket 42. Connected to the elbow 46 of the upper linkage arm 36 is a deployment spring 50 which is connected at its other end to an extension 52 of the bracket 42. A second end 54 of the upper linkage arm 36 is pivotably attached to a slider bar 56 which is slidably mounted to the bracket 42 to guide the deployment movement of the restraint panel 32. The slider bar 56 includes a plurality of guide slots 58 which essentially define the extent of deployment of the restraint. Guide pins 60 fixedly secured to the bracket 42 are received within the guide slots 58 of the slider bar 56 to guide the rearward movement of the restraint panel 32 upon deployment of the knee restraint system.

The lower pivot arm 38 is pivotably mounted to the bracket 42 at a first end 62 thereof. A second end 64 of the pivot arm 38 is designed to engage the restraining panel 32. Whereas the upper linkage 36 is utilized to deploy or push-out the restraining surface 32, the lower arm 38 acts as a brace for the lower part of the restraining panel 32 upon deployment to prevent tilting or collapse as will be subsequently described. In a preferred embodiment, a pocket or groove 66 on the rear of the restraining surface 32 receives the second end 64 of the arm 38 upon deployment.

The first end 62 of the pivot arm 38 also includes a latch hook 68 which is selectively engaged by the inertia latch 40 to maintain the pivot arm 38 in a raised position. The inertia latch 40 is rotatably mounted to the bracket 42 and includes a first latch end 70 adapted to selectively engage the latch hook 68 of the pivot arm 38 and a second latch end 72 adapted to selectively retain the linkage arm 36 against the tension of the spring 50. The second latch end 72 preferably engages the elbow 46 of the linkage arm 36 preventing the spring 50 from pulling the elbow 46 to deploy the restraining system. As will be subsequently described in greater detail, upon a predetermined rate of deceleration, the inertia latch 40 will rotate simultaneously releasing both the upper linkage arm 36 and the pivot arm 38 to deploy the knee restraint of the present invention.

In many restraint systems, the glove box 22 will form a part of the passenger's side knee restraint assembly 30. In a preferred embodiment of the present invention, the glove box 22 will include latch buttons 80 disposed in the front of the box 22 and adapted to control side bolts 82. As part of the present invention, the side bolts 82 are retractably received within striker openings 84 formed in the end of the slider bar 56. Reciprocal movement of the glove box 22 is guided by tracks 86 formed in the bracket 42 which receive rails 88 secured to the sides of the glove box. The glove box 22 is latchingly attached to the deployment assembly in order to allow operation of the glove box 22 yet ensure reconnection in the event of deployment. If the glove box 22 is open during deployment of the knee restraint, extension of the slider bar 56 will re-engage the side bolts 82 such that the surface 32 once again travels with the knee restraint deployment system.

Figure 5:
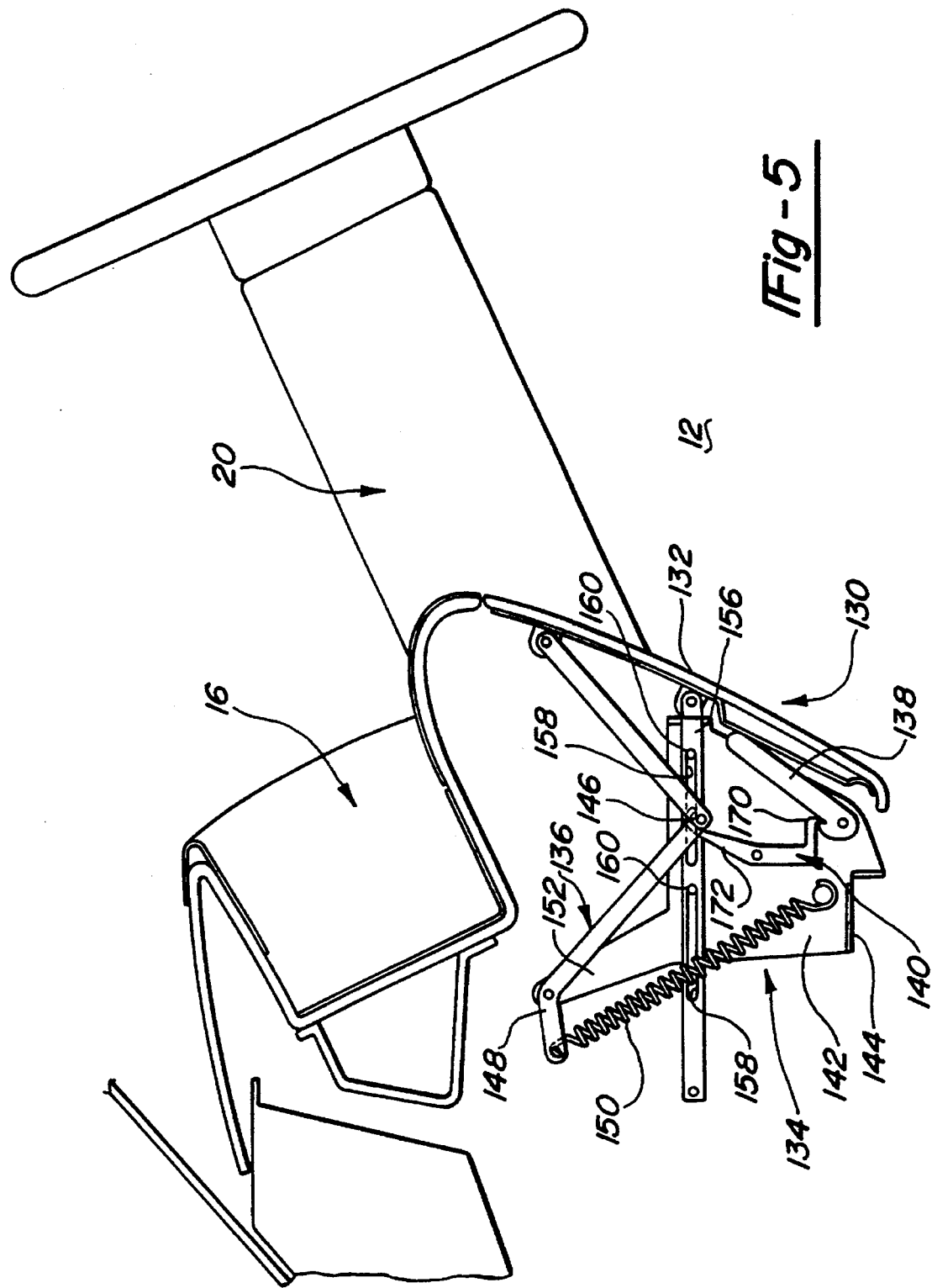
FIG. 5 is a side view of a second embodiment of the knee restraint system during normal vehicle operation.
Figure 6:
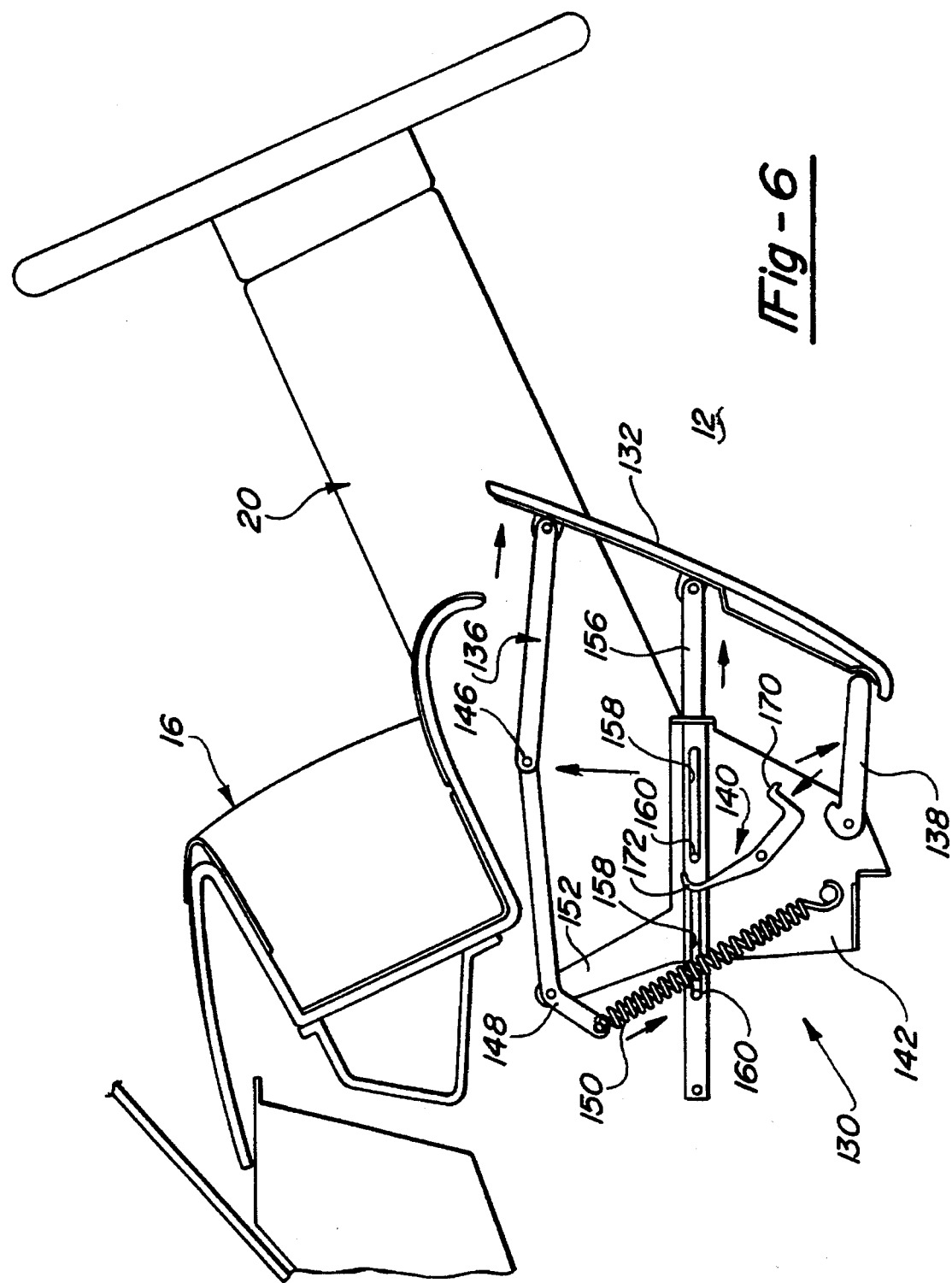
FIG. 6 is a side view of the knee restraint system deployed in the vehicle.

FIGS. 5 and 6 illustrate the knee restraint system 130 independent of a glove box such as would be suitable for the driver's side 12 of the vehicle. The principle of operation is very similar to the first embodiment yet the structure is different to accommodate variations in the structure beneath the dashboard 16. A bracket 142 mounts the entire structure to the cross beam 144 beneath the dashboard 16 in order to selectively deploy the knee restraint panel 132. Mounted to the bracket 142 is a first linkage arm 136, a pivot arm 138 and an inertia latch 140 which retains the linkage arm 136 and pivot arm 138 in the ready position shown in FIG. 5. The inertia latch 140 hooks the elbow 146 of the linkage arm 136. A first end 148 of the linkage arm 136 is rotatably attached to extension 152 of the mounting bracket 142. A second end of the linkage arm 136 is connected to the rear of the restraint panel 132.

The deployment spring 150 is maintained in tension between the bracket 142 and the first end 148 of the linkage arm 136. The first end 148 of the linkage arm 136 is extended past the bracket extension 152 to which the spring 150 is attached thereby cantilevering the linkage arm 136 upon deployment. The other end of the spring 150 is connected to the body of the bracket 142.

A slider bar 156 is slidably mounted to the bracket 142 and connected to the rear of the restraining panel 132. The slider bar 156 includes at least one slot 158 which reciprocally receives a guide pin 160 on the slider bar 156 to control the deployment motion of the knee restraint 130.

As in the first embodiment, the inertia latch 140 is rotatably mounted to the bracket 142. A first latch end 170 retains the pivot arm 138 while a second latch end 172 retains the linkage arm 136. Upon a predetermined rate of deceleration, the inertia latch 140 will simultaneously release the linkage arm 136 and pivot arm 138 to deploy the knee restraint 130.

Operation of the present invention provides instantaneous deployment of the knee restraint 30,130 to limit the forward movement of the lower extremities of the vehicle occupants. Although the knee restraint system could be set to deploy upon sudden deceleration, it is anticipated that deployment would occur only upon deceleration resulting from vehicle impact. Upon such deceleration, the knee restraints 30,130 would move from the position shown in FIGS. 3 and 5 to the position shown in FIGS. 4 and 6 reducing the distance between the knee restraint panel 32, 132 and the occupants' knees.

During normal vehicle operation the inertial latch 40,140 engages both the linkage arm 36,136 and the pivot arm 38,138. The spring 50,150 is under tension attempting to pull the linkage arm 36,136. Upon impact, the sudden deceleration of the vehicle causes the inertia latch 40,140 to rotate simultaneously releasing the elbow 46,146 of the linkage arm 36,136 and the pivot arm 38,138. The tension of the spring 50,150 will immediately deploy the linkage arm 36,136 driving the restraining surface 32,132 rearwardly guided by the slider bar 56,156. The pivot arm 38,138 will pivot downwardly to support the lower part of the restraining surface 32,132. With the knee restraint 30,130 deployed closer to the occupants, forward movement of the occupants is reduced.

Since it is possible for the glove box 22 to be open upon impact, means must be provided for reconnecting with the glove box 22 since the surface 32 is formed by the front of the glove box 22. FIG. 2 shows the glove box 22 in an open position with the side bolts 82 separated from the striker opening 84. Upon deployment of the knee restraint 30, the slider bar 56 will move rearwardly reengaging the side bolt 82 with the opening 84 allowing the surface 32 to travel with the slider bar 56 being deployed by the linkage arm 36. Normally, the side bolts 82 would already be engaged with the slider bar 56 facilitating movement of the surface 32 with the linkage.

The foregoing detailed description has been given for clearness of understanding only and no unnecessary limitations should be understood therefrom as some modifications will be obvious to those skilled in the art without departing from the scope and spirit of the appended claims:

What is claimed is:

1. A selectively deployed restraint assembly an interior passenger compartment of a vehicle, said restraint assembly disposed within and forming part of a substantially vertical forward surface of the vehicle compartment, said restraint assembly deploying to restrain an occupant of the vehicle upon a predetermined rate of vehicle deceleration, said restraint assembly comprising:

a substantially vertical restraining panel forming a part of the vehicle compartment forward surface and selectively deployable longitudinally rearwardly into the passenger compartment to restrain the vehicle occupant; and a selectively releasable linkage attached to said restraining panel to move said restraining panel linearly from a first position forming a part of the forward surface to a second position deployed into the passenger compartment, said linkage including means for securing said restraining panel against retreat from said second position upon impact by the occupant, latching means preventing deployment until a predetermined rate of vehicle deceleration is reached and means for biasing said linkage towards said deployed second position to provide instantaneous deployment of said restraining panel upon release of said latching means.

2. The restraint assembly as defined in claim 1 wherein said releasable linkage includes a linkage arm, a first end of said linkage arm connected to said restraining panel, said linkage arm selectively movable between a contracted position maintaining said restraining panel in said first position and an extended position moving said restraining panel to said deployed second position.

3. The restraint assembly as defined in claim 2 wherein said latching means comprises an inertia latch, said inertia latch maintaining said linkage arm in said contracted position, said inertia latch releasing said linkage arm upon a predetermined rate of deceleration.

4. The restraint assembly as defined in claim 3 wherein said biasing means includes a spring attached to said linkage arm and biasing said linkage arm towards said extended position.

5. The restraint assembly as defined in claim 4 wherein said linkage arm includes at least two segments connected at an elbow.

6. The restraint assembly as defined in claim 5 wherein said inertia latch and said spring are connected to said elbow of said linkage arm.

7. The restraint assembly as defined in claim 4 and further comprising a slider bar reciprocally movable in conjunction with said linkage arm, said first end of said linkage arm connected to said slider bar.

8. The restraint assembly as defined in claim 7 wherein said slider bar includes a striker opening, said restraining panel at least partially formed by a front panel of a storage compartment, said front panel including closure means selectively engaging said striker opening whereby said striker opening engages said closure means upon extension of said slider bar and linkage arm to deploy said restraining panel.

9. The restraint assembly as defined in claim 3 wherein said means for securing said restraining panel against retreat comprises a pivot arm releasably attached to said inertia latch, said pivot arm selectively pivotable between a first position connected to said inertia latch and a second position in contact with said restraining panel following deployment to prevent collapse of said restraining panel.

10. A selectively deployed restraint assembly for an interior passenger compartment of a vehicle, said restraint assembly disposed within a forward surface of the vehicle compartment and formed at least in part by a storage compartment having a selectively operable door with closure means, said restraint assembly deploying to restrain an occupant of the vehicle upon a predetermined rate of vehicle deceleration, said restraint assembly comprising:

a restraint panel formed at least in part by the selectively operable door of the storage compartment, said restraining panel deployable rearwardly into the passenger compartment to restrain the vehicle occupant; and a selectively releasable linkage attached to said restraining panel to move said restraining panel from a first position forming a part of the forward surface to a second position deployed into the passenger compartment, said linkage including:

a slider bar reciprocally movable to deploy said restraining panel and having a striker opening selectively receiving the closure means of the storage compartment door;

a linkage arm having a first end connected to said slider bar for moving said slider bar and restraining panel between said first and second positions, said linkage arm selectively movable between a contracted position maintaining said slider bar and restraining panel in said first position and an extended position moving said restraining panel to said deployed second position, said linkage arm connected to means for biasing said linkage arm towards said extended position; and an inertia latch selectively connected to said linkage arm for maintaining said linkage arm in said contracted position against the force of said biasing means, said inertia latch releasing said linkage arm upon a predetermined rate of deceleration.

11. The restraint assembly as defined in claim 10 wherein said linkage arm includes two segments, a first end of a first segment attached to said slider bar and a second end of a second segment fixedly attached to the vehicle, said first and second segments joined to form a pivotable elbow of said linkage arm.

12. The restraint assembly as defined in claim 10 and further comprising a pivot arm releasably attached to said inertia latch, said pivot arm selectively pivotable between a first position connected to said inertia latch and a second position in contact with said restraining panel following deployment to brace said restraint panel against collapse.

13. The restraint assembly as defined in claim 12 wherein said closure means includes laterally extending bolts selectively received within said striker opening of said slider bar, whereby said striker opening will re-engage said closure bolts upon extension of said linkage arm to capture said storage compartment door forming at least part of said restraining panel in the event the storage compartment is open upon deceleration.

14. A selectively deployed restraint assembly for an interior passenger compartment of a vehicle, said restraining assembly disposed within and forming a part of a forward surface of the vehicle compartment, said restraint assembly deploying to restrain an occupant of the vehicle upon a predetermined rate of vehicle deceleration, said restraining assembly comprising:

a restraining panel forming a part of the vehicle compartment forward surface and selectively deployable rearwardly into the passenger compartment to restrain the vehicle occupant; and a selectively releasable linkage attached to said restraining panel to move said restraining panel from a first position forming a part of the forward surface linearly to a second position deployed into the passenger compartment, said linkage including;

a linkage arm having a first end connected to said restraining panel, said linkage arm selectively movable between a contracted position maintaining said restraining panel in said first position and an extended position moving said restraining panel linearly rearwardly to said deployed second position spaced longitudinally rearwardly from said first position, said linkage arm connected to means for biasing said linkage arm towards said extended position and including means for securing said restraining panel against retreat from said second position; and an inertia latch proximate said linkage arm maintaining said linkage arm in said contracted position against the force of said biasing means, said inertia latch releasing said linkage arm upon a predetermined rate of deceleration.

15. The restraint assembly as defined in claim 14 and further comprising a mounting bracket for said selectively releasable linkage, a second end of said linkage arm pivotably attached to said mounting bracket and said inertia latch rotatably mounted to said bracket.

16. The restraint assembly as defined in claim 15 wherein said biasing means includes a spring attached to said mounting bracket and said linkage arm biasing said arm towards said extended position.

17. The restraint assembly as defined in claim 16 wherein said means for securing said restraining panel against retreat comprises a pivot arm pivotably mounted to said bracket and releasably connected to said inertia latch, said pivot arm selectively pivotable between a first position connected to said inertia latch and a second position in contact with said restraining panel following deployment to brace said restraining panel against collapse.

18. The restraint assembly as defined in claim 17 wherein said linkage includes a slider bar reciprocally mounted to said bracket and attached to said restraining panel to guide deployment of said restraining panel upon extension of said linkage arm.

* * * * *